(12) United States Patent
Chien et al.

(10) Patent No.: US 12,451,012 B2
(45) Date of Patent: Oct. 21, 2025

(54) METHOD FOR COLLISION WARNING, ELECTRONIC DEVICE, AND STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 362 days.

(21) Appl. No.: 18/097,850

(22) Filed: Jan. 17, 2023

(65) Prior Publication Data

US 2024/0127694 A1    Apr. 18, 2024

(30) Foreign Application Priority Data

Oct. 13, 2022   (CN) .......................... 202211252473.1

(51) Int. Cl.
*G08G 1/16*    (2006.01)
*B60Q 9/00*    (2006.01)
(Continued)

(52) U.S. Cl.
CPC .................. *G08G 1/16* (2013.01); *G01S 7/40* (2013.01); *G01S 7/417* (2013.01); *G01S 13/867* (2013.01);
(Continued)

(58) Field of Classification Search
CPC ............. G08G 1/16; G06T 7/80; G06T 7/579; G06T 7/20; G06T 2207/10028;
(Continued)

(56) References Cited

U.S. PATENT DOCUMENTS

2014/0297171 A1* 10/2014 Minemura ............. B60R 21/34
                                                    342/70
2015/0329112 A1* 11/2015 Jeon ................. B60W 30/18109
                                                    701/41
(Continued)

FOREIGN PATENT DOCUMENTS

CN        109359409       2/2019
CN        114537374       5/2022

OTHER PUBLICATIONS

Chen, Yuan-Lin, Kun-Yuan Shen, and Shun-Chung Wang. "Forward collision warning system considering both time-to-collision and safety braking distance." 2013 IEEE 8th Conference on Industrial Electronics and Applications (ICIEA). Ieee, 2013. (Year: 2013).*

*Primary Examiner* — Bernarr E Gregory
*Assistant Examiner* — Nazra Nur Waheed
(74) *Attorney, Agent, or Firm* — ScienBiziP, P.C.

(57) ABSTRACT

A method for collision warning implemented in an electronic device includes fusing obtained radar information and image information; recognizing at least one obstacle in a traveling direction of a vehicle according to the fused radar information and image information; determining motion parameters of the at least one obstacle and the vehicle according to the radar information and the image information; and calculating a collision time between the vehicle and the at least one obstacle according to the motion parameters, and issuing a collision warning.

13 Claims, 2 Drawing Sheets

(51) Int. Cl.
  *G01S 7/40* (2006.01)
  *G01S 7/41* (2006.01)
  *G01S 13/86* (2006.01)
  *G01S 13/931* (2020.01)
  *G06T 7/20* (2017.01)
  *G06T 7/579* (2017.01)
  *G06T 7/80* (2017.01)
  *G06V 10/80* (2022.01)
  *G06V 10/82* (2022.01)
  *G06V 20/58* (2022.01)

(52) U.S. Cl.
  CPC .............. *G01S 13/931* (2013.01); *G06T 7/20* (2013.01); *G06T 7/579* (2017.01); *G06T 7/80* (2017.01); *G06V 10/803* (2022.01); *G06V 10/82* (2022.01); *G06V 20/58* (2022.01); *B60Q 9/008* (2013.01); *G06T 2207/10028* (2013.01); *G06T 2207/10044* (2013.01); *G06T 2207/20221* (2013.01); *G06T 2207/30261* (2013.01)

(58) Field of Classification Search
  CPC ........... G06T 2207/10044; G06T 2207/20221; G06T 2207/30261; G06V 20/58; G06V 10/803; G06V 10/82; G01S 7/40; G01S 7/417; G01S 13/867; G01S 13/931; B60Q 9/008
  See application file for complete search history.

(56) References Cited

U.S. PATENT DOCUMENTS

2020/0218913 A1* 7/2020 Unnikrishnan ....... G01S 13/867
2022/0198806 A1* 6/2022 Wang .................... G06N 3/045
2023/0008015 A1* 1/2023 Bodnariuc ............ G06V 10/25

* cited by examiner

METHOD FOR COLLISION WARNING, ELECTRONIC DEVICE, AND STORAGE MEDIUM

FIELD

The subject matter herein generally relates to a technology of safe driving, and particularly to a method for collision warning, an electronic device, and a storage medium.

BACKGROUND

The warning system for avoiding vehicle collisions can help users to avoid traffic accidents such as collisions, by continuously detecting the road conditions in the travelling direction of the vehicle. However, such warning system may not accurately recognize all categories of obstacle, and the time of warning may not always be accurate.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
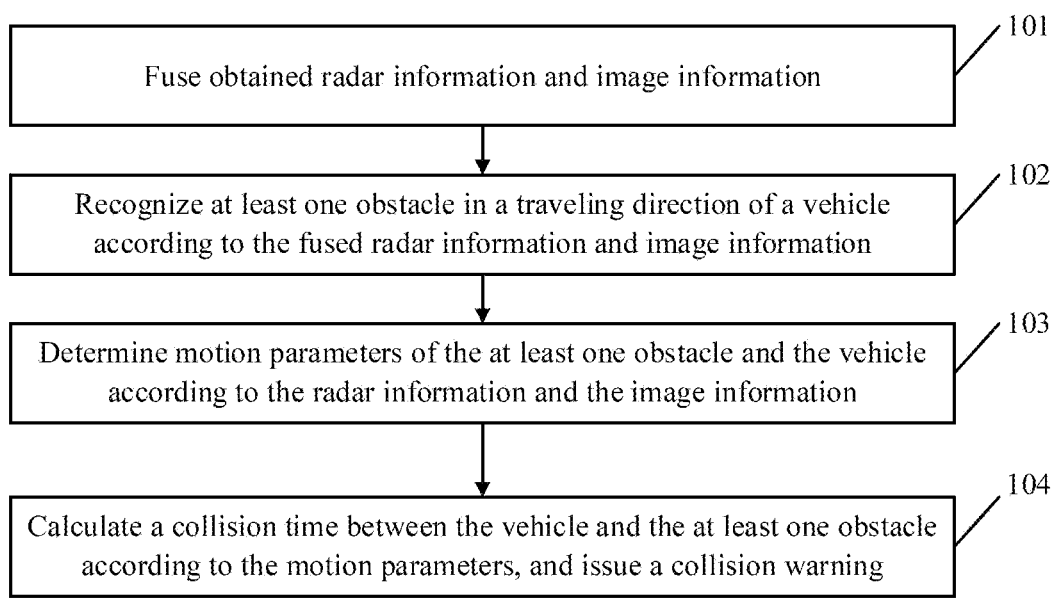
FIG. 1 illustrates a flowchart of an embodiment of a method for collision warning according to the present disclosure.

Plurality of embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have their common meanings as construed by those of ordinary skills in the art to which the present disclosure pertains. The terms "first", "second" and the like used in the embodiments of the present disclosure do not represent any order, quantity, or importance, but are merely used to distinguish between different components. The terms "include", "contain" or the like mean that elements or articles appearing before such terms may cover elements or articles listed after the words and their equivalents without excluding other elements or articles. The terms "connect", "link" or the like are not limited to physical or mechanical connection, but may include electrical connections, whether direct or indirect.

In one embodiment, a system for giving warning as to vehicle collision should be able to quickly and effectively detect potentially dangerous situations by continuously detecting the road conditions in the travelling direction of the vehicle, and outputting sound and/or visual warning, which helps users to avoid rear-end collisions, prevent unintended departures from the correct lane, avoid collision with obstacles such as pedestrians, and other traffic accidents. However, a warning system which does not accurately recognize the obstacle categories, and give a warning in time is not effective.

In order to solve the above problems, a method for collision warning is provided, the method determines the motion parameters of obstacles and vehicles according to radar information and image information, based on the method of integrating monocular vision with the millimeter-wave radar, and calculates a collision time of the vehicle and obstacle according to the motion parameters, thereby effectively improving the accuracy of recognition of obstacles and vehicles and their motion parameters and giving timely warnings, assisting users to drive safely.

In one embodiment, the method for collision warning is applied to an electronic device (e.g., the electronic device shown in FIG. 2), the electronic device can be a vehicle-mounted device in a vehicle. The electronic device can be integrated with a collision warning function, or the collision warning function can be run on the electronic device in a form of a software development kit (SDK).

FIG. 1 illustrates a flowchart of an embodiment of a method for collision warning. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, fusing obtained radar information and image information.

In one embodiment, the electronic device may include a plurality of sensors, such as distance sensors and image sensors. In detail, the distance sensor may include a radar device (e.g., a millimeter-wave radar), and the image sensor may include a camera device (e.g., a monocular camera). In one embodiment, the electronic device may be a vehicle-mounted device arranged in the vehicle, the electronic device includes a software system for executing various instructions. In other embodiments, the electronic device may also be an external device in communication with the vehicle, and can obtain the vehicle data and provide control of the vehicle.

The radar device may be installed in the vehicle, such as within or without the front windshield of the vehicle, the radar device is used to obtain a point cloud (e.g., a 3D point cloud) in the travelling direction of the vehicle. The camera device may be installed in the front windshield of the vehicle or other location, the camera device is used to capture images (e.g., 2D images) of the view of the travelling direction of the vehicle. The camera device may be an automobile data recorder installed in the vehicle, or may include more than one camera. The camera device may be an independent device communicated with the vehicle through a network or the like, not being limited.

In one embodiment, the method further includes: jointly calibrating the radar device that obtains the radar information and the camera device that obtains the image information, fusing the point cloud included in the radar information and the image included in the image information, and projecting the point cloud onto the image.

In a multi-sensor detection system which includes the radar device and the camera device, the two sensors are jointly calibrated before the fusion of radar information and image information, so as to obtain a relationship between the points in the point cloud and the pixels in the image, then the 3D point cloud is projected onto the 2D image, completing the fusion of radar information and image information.

In one embodiment, jointly calibrating and fusing the radar information and the image information includes: obtaining external parameters (i.e., a rotation matrix, a translation vector, etc.) of the radar device and the camera device; obtaining a transformation matrix between a world coordinate system based on the location of the radar device and a coordinate system where the camera device is located based on the external parameters. The transformation matrix is calculated by using a Perspective-n-Point algorithm, projecting the points in the 3D point cloud coordinate system to the 3D coordinate system where the camera device is located based on the transformation matrix; obtaining internal parameters (i.e., focal length, principal point, tilt coefficient, distortion coefficient, etc.) of the camera device by calibrating the camera device, removing any distortion of a convex lens of the camera device based on the internal parameters; and projecting the points in the 3D coordinate system where the camera device is located onto the 2D image. In detail, a variety of calibration tools can be used to implement the above process, for example, the sensor calibration tool of Apollo, Calibration Tookit module of autoware, and the like.

In one embodiment, the multi-sensor detection system improves the vehicle's ability to perceive the environment and safety, the fusion of a distance sensor and an image sensor has obvious advantages in obtaining environment information and performing target recognition. In comparison with other distance sensors, millimeter-wave radar has the advantages of wide detection range and is less influenced by the weather, and a broad range of applications.

In other embodiments, the radar device and the camera device may also be installed at other locations of the vehicle, for example, at the rear windshield of the vehicle, so as to enable a collision warning prompt when the rear of the vehicle is about to be rear-ended, in combination with subsequent steps.

At block 102, recognizing at least one obstacle in the traveling direction of the vehicle according to the fused radar information and image information.

In one embodiment, recognizing at least one obstacle in the traveling direction of the vehicle according to the fused radar information and image information includes: recognizing a target object in the image by a preset deep neural network, determining an encircling frame of the target object; classifying the fused point cloud based on the encircling frame of the target object, and clustering the classified point cloud; obtaining an encircling box according to the clustered point cloud and the encircling box of the target object; determining whether the target object is the obstacle based on the encircling box, and determining a category of the obstacle when the target object is the at least one obstacle.

In one embodiment, the deep neural network may be a YOLOv3 (You Only Look Once V3) model, the YOLOv3 model divides the image into a plurality of sub-regions by using a fully convolutional network, predicts a bounding frame of the object and the probability of the category of the object to which each sub-region belongs based on the plurality of sub-regions, removes at least one redundant bounding frame by a non-maximum value suppression algorithm, so as to distinguish each object in the image and determine the category of each object, and determine the encircling frame (2D bounding frame) of the target object, which can save calculation time and improve the accuracy of detection of each object.

In one embodiment, the target objects may include pedestrians, vehicles, guardrails, lane markings, waste paper bins, and the like.

In one embodiment, after the encircling frame of the target object is determined, recognizing at least one obstacle in the traveling direction of the vehicle according to the fused radar information and the image information includes: classifying the points in the 3D point cloud that have been projected to the 2D image, based on the 2D encircling frame of the target object in the 2D image; removing noise points in the classified 3D point cloud and the points which are far from 3D point cloud in each category by using a clustering algorithm, for example, the points which are far from the 3D point cloud in each category are determined based on a preset distance threshold; inputting the clustered 3D point cloud and the image of the 2D encircling frame of the target object into a deep learning network (e.g., a deep convolutional neural network), obtaining a 3D encircling box of the clustered 3D point cloud by regression, and obtaining the category of each target object in the corresponding encircling box, and the position and category of each obstacle in the target objects, the obstacle can be any target object that is not low or flat, such as pedestrians, vehicles, and guardrails.

In one embodiment, based on the 2D encircling frame and the 3D encircling box, the categories of the fused point cloud and the target object in the image are detected twice, in the 2D and in the 3D dimensions, effectively improving the detection accuracy of the category of the object.

At block 103, determining motion parameters of the at least one obstacle and the vehicle according to the radar information and the image information.

In one embodiment, determining the motion parameters of the at least one obstacle and vehicle according to the radar information and the image information includes: determining a relative distance and a relative velocity between the at least one obstacle and the vehicle according to the radar information, and predicting a predicted moving distance of the at least one obstacle based on the image information and the relative velocity.

In one embodiment, the radar device may calculate the relative velocity between the obstacle and the radar device based on a Doppler effect. In detail, according to the Doppler effect, an obstacle approaching the radar antenna will cause the reflected signal frequency to be higher than the frequency of the transmitter; conversely, when the obstacle is moving away from the antenna, the reflected signal frequency will be lower than the frequency of the transmitter, therefore, the relative velocity can be calculated according to the change in value of the frequency (the Doppler frequency is positive when the obstacle is moving towards the radar, and the Doppler frequency is negative when the obstacle is moving away from the radar).

In one embodiment, the 3D point cloud obtained by the radar device includes depth information of each point from the radar device, and the minimum depth among all points of the at least one obstacle may be taken as the depth of the point cloud of the obstacle. In addition, when the radar device is installed, the distance between the radar device and the vehicle body (e.g., the distance between the radar device installed at the front windshield of the vehicle and the front of the vehicle) can be determined, the relative distance between the at least one obstacle and the vehicle is calculated according to the following preset formula:

a relative distance=a depth of the point cloud depth of the obstacle−a distance between the radar device and the vehicle body.

In one embodiment, calculating the predicted moving distance of the obstacle based on the image information and the relative velocity includes: obtaining an interval time between capturing two adjacent images, the two adjacent images both include the vehicle and the at least one obstacle, and two relative velocities of the obstacles in the two adjacent images; calculating an acceleration of the obstacle according to the interval time and the two relative velocities; and calculating the predicted moving distance according to the interval time and the acceleration.

In one embodiment, the interval time t may be obtained based on a frame rate of the camera device capturing the images, for example, when the frame rate is 30 frames per second, the interval time t=1/30 seconds. In addition, the obstacle can be assumed to be an object moving in a straight line with uniform acceleration, the relative velocity having an earlier capturing time in the two relative velocities is recorded as V1, and the relative velocity with a later capturing time in the two relative velocities is recorded as V2. Then the acceleration a of the obstacle can be calculated according to the formula: V2=V1+at (the value a can be a positive value, a negative value, or 0).

In one embodiment, when calculating the predicted moving distance of an object, the following situations are included, not limited to these: situation 1, the obstacle and the vehicle are traveling in the same direction and the acceleration of the obstacle is a negative value; situation 2, the obstacle and the vehicle are travelling in different directions relative to each other and the acceleration of the obstacle is a positive value; situation 3, the obstacle is stationary.

For example, under the situation 1, the first vehicle is travelling in one lane of a dual-lane roadway, and the second vehicle in front travelling in the same direction is slowing down; under the situation 2, the first vehicle is travelling in a single-lane, and the front second vehicle is travelling in the opposite travelling direction relative to the travelling direction of the first vehicle is braking; under the situation 3, the first vehicle is travelling, and there are obstacles such as roadblocks in front of the first vehicle etc. In detail, based on the fused radar information and image information, it is easy to determine the specific situation in which the vehicle is located, and will not be described in detail.

In one embodiment, the predicted moving distance S under situations 1 and 2 are calculated by the following formula: $S=v_0 t+(at^2/2)$, $v_0$ indicates the velocity of the obstacle in the last image obtained by the collision warning system. Under the situation 3, the predicted moving distance S is zero. It is assumed that the collision warning system can determine whether to issue the warning within the interval time t. In other embodiments, the time t in this formula can also be set according to the actual calculated velocity of the collision warning system.

At block 104, calculating a collision time between the vehicle and the at least one obstacle according to the motion parameters, and issuing a collision warning.

In one embodiment, the collision time includes a countdown (e.g., one second) for the vehicle to collide with the at least one obstacle, calculating a collision time between the vehicle and the at least one obstacle according to the motion parameters, and issuing a collision warning includes: calculating a first collision countdown according to the motion parameters; calculating a second collision countdown according to the motion parameters; when the first collision countdown is less than the second collision countdown, issuing the collision warning.

In one embodiment, the first collision countdown may be calculated according to the motion parameters for each of the above-mentioned situations. For example, under the situation 1, calculating a first collision countdown according to the motion parameters includes: determining the first collision countdown to be proportional to the relative distance between the at least one obstacle and the vehicle, and the predicted moving distance of the obstacle, and to be inversely proportional to the relative velocity between the at least one obstacle and the vehicle. For example, the first collision countdown=(the relative distance+the predicted moving distance)/the relative velocity.

In other embodiments, under the situation 2, calculating a first collision countdown according to the motion parameter includes: determining the first collision countdown to be proportional to the relative distance between the at least one obstacle and the vehicle, and to be inversely proportional to the relative velocity between the vehicle and the at least one obstacle, and the predicted moving distance of the at least one obstacle. For example, the first collision countdown= (the relative distance−the predicted moving distance)/the relative velocity.

In one embodiment, calculating a second collision countdown according to the motion parameter includes: calculating a braking distance of the vehicle according to the velocity and a gravitational acceleration of the vehicle, the braking distance is proportional to a square of the velocity of the vehicle, and is inversely proportional to the gravitational acceleration; determining the second collision countdown to be proportional to the braking distance, and to be inversely proportional to the relative velocity. For example, the braking distance=(self-vehicle velocity*self-vehicle velocity)/(2*0.9*g), and the second collision countdown=braking distance/relative velocity, g represents the gravitational acceleration.

In one embodiment, the collision warning may be issued in a preset manner, and the preset manner may include, but is not limited to, displaying text or image content, outputting audio, and driver-conscious vibrations.

In one embodiment, the collision warning method is based on the method of integrating millimeter-wave radar with monocular vision, determines the motion parameters of obstacles and vehicles according to radar information and image information, and calculates the distance between vehicles and obstacles and other vehicles according to the motion parameters. The first collision countdown and the second collision countdown enable, when the first collision countdown is less than the second collision countdown, a collision warning to be issued, which can effectively improve the accuracy of obstacle recognition and the accuracy of the warning time, and assist the user to drive safely.

Figure 2:
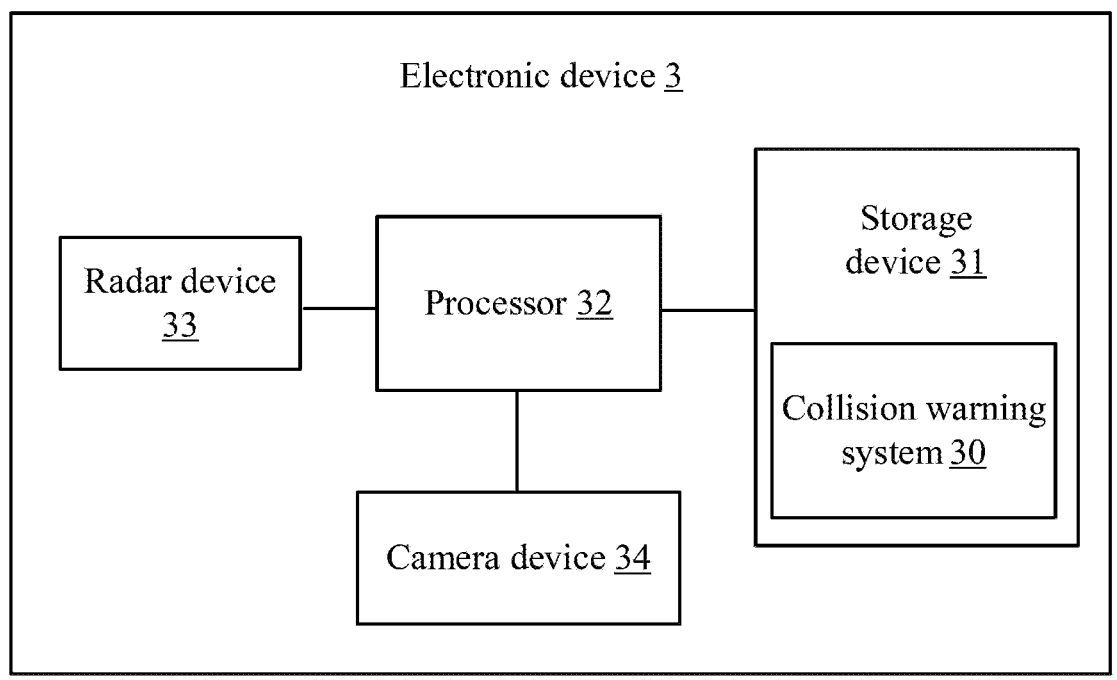
FIG. 2 is a block diagram of an embodiment of an electronic device according to the present disclosure.

FIG. 2 illustrates the electronic device 3 in one embodiment. The electronic device 3 can be a vehicle-mounted device. The electronic device 3 includes, but is not limited to, a storage device 31, a processor 32, at least one radar device 33, and at least one camera device 34. FIG. 2 illustrates only one example of the electronic device 3. Other examples can include more or fewer components than as illustrated or have a different configuration of the various components in other embodiments.

The processor 32 can be a central processing unit (CPU), a microprocessor, or other data processor chip that performs functions in the electronic device 1.

In one embodiment, the storage device 31 can include various types of non-transitory computer-readable storage mediums. For example, the storage device 31 can be an internal storage system, such as a flash memory, a random access memory (RAM) for the temporary storage of information, and/or a read-only memory (ROM) for permanent storage of information. The storage device 31 can also be an external storage system, such as a hard disk, a storage card, or a data storage medium.

The storage device 31 stores instructions, the processor 32 executes the computer program stored in the storage device 31 for implementing the method for collision warning provided in the embodiments of the present disclosure. The computer program can include instructions.

In some embodiments, the collision warning system 30 runs in the electronic device 3. The collision warning system 30 may include a plurality of functional modules including program code segments. The program code of each program segment of the collision warning system 30 can be stored in the storage device 31 of the electronic device 3 and executed by at least one processor 32 to realize the collision avoidance warning function as shown in FIG. 1.

Upon execution of the instructions stores in the storage device 31, the processor 32 is configured to:
fuse obtained radar information and image information;
recognize at least one obstacle in the traveling direction of the vehicle according to the fused radar information and image information;
determine motion parameters of the at least one obstacle and the vehicle according to the radar information and the image information;
calculate a collision time between the vehicle and the at least one obstacle according to the motion parameters, and issue a collision warning.

Although not shown, the electronic device 3 may also include a power supply (such as a battery) that supplies power to various components. The power supply may be logically connected with processor 32 through a power management device, thereby achieving functions such as managing charge, discharge, and power consumption management through a power management device. The power supply may also include one or more DC or AC power supplies, recharging devices, power failure test circuits, power converters or inverters, power status indicators and other arbitrary components. The electronic device 3 can also include a variety of sensors, Bluetooth module, Wi-Fi module, etc., which is not described.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor; and
a storage device coupled to the at least one processor and storing instructions for execution by the at least one processor to cause the at least one processor to:
fuse obtained radar information and image information;
recognize at least one obstacle in a traveling direction of a vehicle according to the fused radar information and the image information;
determine motion parameters of the at least one obstacle and the vehicle according to the fused radar information and the image information; and
calculate a first collision countdown according to the motion parameters, the first collision countdown being proportional to a relative distance between the at least one obstacle and the vehicle and a predicted moving distance of the at least one obstacle and inversely proportional to a relative velocity between the at least one obstacle and the vehicle, calculate a braking distance of the vehicle according to a velocity of the vehicle and a gravitational acceleration, calculate a second collision countdown according to the motion parameters and the braking distance, the braking distance being proportional to a square of the velocity of the vehicle, and inversely proportional to a gravitational acceleration, the second collision countdown being proportional to the braking distance and inversely proportional to the relative velocity, and issue a collision warning when the first collision countdown is less than the second collision countdown.

2. The electronic device according to claim 1, wherein the at least one processor is further caused to:
determine the relative distance and the relative velocity between the at least one obstacle and the vehicle according to the radar information; and
calculate the predicted moving distance of the at least one obstacle based on the image information and the relative velocity.

3. The electronic device according to claim 1, wherein the at least one processor is further caused to:
jointly calibrate a radar device that obtains the radar information and a camera device that obtains the image information; and
fuse a point cloud comprised in the radar information and an image comprised in the image information, and project the point cloud onto the image.

4. The electronic device according to claim 3, wherein the at least one processor is further caused to:
recognize a target object in the image based on a preset deep neural network, and determine an encircling frame of the target object;
classify the fused point cloud based on the encircling frame of the target object, and cluster the classified point cloud;
obtain an encircling box according to the clustered point cloud and the encircling frame of the target object; and
determine whether the target object is the at least one obstacle based on the encircling box, and determine a category of the at least one obstacle when the target object is the at least one obstacle.

5. The electronic device according to claim 2, wherein the at least one processor is further caused to:
obtain an interval time between capturing two adjacent images, and two relative velocities corresponding to two obstacles in the two adjacent images;

calculate an acceleration of the at least one obstacle according to the interval time and the two relative velocities; and calculate the predicted moving distance according to the interval time and the acceleration.

6. A method for collision warning implemented in an electronic device comprising:

fusing obtained radar information and image information;

recognizing at least one obstacle in a traveling direction of a vehicle according to the fused radar information and image information;

determining motion parameters of the at least one obstacle and the vehicle according to the fused radar information and image information; and calculating a first collision countdown according to the motion parameters, the first collision countdown being proportional to the relative distance between the at least one obstacle and the vehicle and the predicted moving distance of the at least one obstacle and inversely proportional to the relative velocity between the at least one obstacle and the vehicle, calculating a braking distance of the vehicle according to a velocity of the vehicle and a gravitational acceleration, calculating a second collision countdown according to the motion parameters and the braking distance, the braking distance being proportional to a square of the velocity of the vehicle, and inversely proportional to the gravitational acceleration, the second collision countdown being proportional to the braking distance and inversely proportional to the relative velocity, and issuing a collision warning when the first collision countdown is less than the second collision countdown.

7. The method according to claim 6, wherein determining motion parameters of the at least one obstacle and the vehicle according to the fused radar information and image information comprises:

determining the relative distance and the relative velocity between the at least one obstacle and the vehicle according to the radar information; and calculating the predicted moving distance of the at least one obstacle based on the image information and the relative velocity.

8. The method according to claim 6, further comprising:

jointly calibrating a radar device that obtains the radar information and a camera device that obtains the image information; and fusing a point cloud comprised in the radar information and an image comprised in the image information, and projecting the point cloud onto the image.

9. The method according to claim 8, wherein recognizing at least one obstacle in a traveling direction of a vehicle according to the fused radar information and image information comprises:

recognizing a target object in the image based on a preset deep neural network, and determining an encircling frame of the target object;

classifying the fused point cloud based on the encircling frame of the target object, and clustering the classified point cloud;

obtaining an encircling box according to the clustered point cloud and the encircling frame of the target object; and determining whether the target object is the at least one obstacle based on the encircling box, and determining a category of the at least one obstacle when the target object is the at least one obstacle.

10. The method according to claim 7, wherein calculating a predicted moving distance of the at least one obstacle based on the image information and the relative velocity comprises:

obtaining an interval time between capturing two adjacent images, and two relative velocities corresponding to two obstacles in the two adjacent images;

calculating an acceleration of the at least one obstacle according to the interval time and the two relative velocities; and calculating the predicted moving distance according to the interval time and the acceleration.

11. A non-transitory computer-readable storage medium having instructions stored thereon, when the instructions are executed by a processor of an electronic device, the processor is configured to perform a method for collision warning, wherein the method comprises:

fusing obtained radar information and image information;

recognizing at least one obstacle in a traveling direction of a vehicle according to the fused radar information and image information;

determining motion parameters of the at least one obstacle and the vehicle according to the fused radar information and image information; and calculating a first collision countdown according to the motion parameters, the first collision countdown being proportional to the relative distance between the at least one obstacle and the vehicle and the predicted moving distance of the at least one obstacle and inversely proportional to the relative velocity between the at least one obstacle and the vehicle, calculating a braking distance of the vehicle according to a velocity of the vehicle and a gravitational acceleration, calculating a second collision countdown according to the motion parameters and the braking distance, the braking distance being proportional to a square of the velocity of the vehicle, and inversely proportional to the gravitational acceleration, the second collision countdown being proportional to the braking distance and inversely proportional to the relative velocity, and issuing a collision warning when the first collision countdown is less than the second collision countdown.

12. The non-transitory computer-readable storage medium according to claim 11, wherein determining motion parameters of the at least one obstacle and the vehicle according to the fused radar information and image information comprises:

determining the relative distance and the relative velocity between the at least one obstacle and the vehicle according to the radar information; and calculating the predicted moving distance of the at least one obstacle based on the image information and the relative velocity.

13. The non-transitory computer-readable storage medium according to claim 11, wherein the method further comprises:

jointly calibrating a radar device that obtains the radar information and a camera device that obtains the image information; and fusing a point cloud comprised in the radar information and an image comprised in the image information, and projecting the point cloud onto the image.

* * * * *